UNITED STATES PATENT OFFICE.

CHARLES EMILE SOANE, OF LONDON, ENGLAND, ASSIGNOR OF ONE-HALF TO USHER-WALKER, LIMITED, OF LONDON, ENGLAND.

RESILIENT COMPOSITION FOR PRINTERS' ROLLERS.

1,223,745.     Specification of Letters Patent.     Patented Apr. 24, 1917.

No Drawing.     Application filed February 2, 1916. Serial No. 75,787.

*To all whom it may concern:*

Be it known that I, CHARLES EMILE SOANE, a subject of the King of England, residing in Hornsey, London, England, have invented certain new and useful Improvements in Resilient Compositions for Printers' Rollers, of which the following is a specification.

This invention is for improvements in resilient compositions for printers' rollers.

In my application for U. S. Letters Patent Serial No. 878,800, filed December 23, 1914, which I applied for in my name which was then Charles Emile Sohn and which has since been changed by the ordinary method of a deed poll, to Charles Emile Soane, there is described a method for producing an infusible resilient composition from gelatinous compositions such as soaked glue and glycerin by treating such mixtures with hexamethylenetetramin. The substance produced in the manner thus described did not possess the disadvantages of other gelatinous compositions not so treated or treated with formaldehyde or trioxymethylene, disadvantages which, in the case of untreated compositions, consist in their liability to distortion, fusion, or even bursting when subjected to a high temperature, and in the case of compositions treated with formaldehyde of the rapid setting of the gelatinous mixture and consequent diminution in strength of the resulting material.

Throughout this specification the term "infusible" as applied to the composition means that on the application of heat the composition does not melt, even at about the temperature of boiling water, and even beyond such temperatures no melting at all occurs but decomposition will of course eventually set in with the destruction of the composition.

It has now been found that the treatment of water-containing gelatinous compositions with other substances than hexamethylenetetramin in the proportions mentioned in the specification referred to above can impart the desired degree of infusibility to such compositions, while at the same time giving them ample time to set in order to enable molding operations to be conveniently carried out and to produce a composition which is not weakened by the treatment it has been subjected to. The compounds which it has been found can be employed in the treatment of water-containing gelatinous compositions instead of hexamethylenetetramin are compounds produced by the condensation of an aldehyde, preferably formaldehyde, with an amino or imino compound, such for example as the condensation products of anilin or methylamin with formaldehyde.

According to this invention therefore a method of producing an infusible resilient composition for printers' rollers consists in treating a gelatinous water-containing mass, such as a mixture of glue soaked in water and glycerin, with compounds produced by the condensation of an aldehyde with an amino or imino compound.

The following is a description of one method of carrying this invention into effect in the production of printers' rollers:—

Glue is soaked in water until the desired quantity has been absorbed and then it is allowed to stand until flexible, after which it is mixed with glycerin in the usual proportions and these are melted up together say in a steam heated copper. The aldehyde or aldehydic condensation product is then introduced into this mixture. When the product to be added is insoluble as for example in the case of formanilin (the condensation product produced by reacting anilin with formaldehyde) it is mixed into a cream with glycerin or water or a mixture of the two (preferably glycerin by itself is employed for this purpose) and added to the melted composition. In the case of the anilin condensation product with formaldehyde, which is produced according to the equation

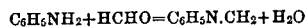

or

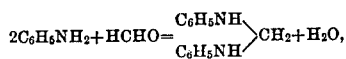

about ½ to 1% upon the quantity of the gellatinous composition must be added. The condensation product of ortho-toluidin with formaldehyde can also be employed in about the same proportions as that of the anilin condensation product, but the latter is the most conveniently prepared of the various amino-formaldehyde condensation products.

In preparing the formaldehyde condensation products with amino compounds, a vigorous reaction takes place, which may be moderated by cooling. The excess of the amino compound (*e. g.* anilin) can be separated from the condensation product by dissolving it out with a suitable solvent.

The quantity of other condensation products of formaldehyde or other aldehyde to be added to the composition, when such are employed, can be easily determined from the amount of aldehyde such compounds will yield on decomposition, bearing in mind that hexamethylenetetramin (from the decomposition of one molecule of which six molecules of formaldehyde are obtained) is conveniently employed in the proportion of between .2% and 1% on the composition. The quantity of the cyclic aldehyde, for example furfural, can likewise easily be determined.

After the composition has been mixed the remainder of the process is carried out in the same manner as described in the previous United States application Ser. No. 878800 referred to above, namely, the whole is stirred and run into molds of the desired shape. It is unnecessary, however, to maintain the molds in a heated condition—the ordinary summer temperature of a room suffices to keep the molds at the desired temperature, and during the cooling the necessary reactions take place in the composition.

The proportions mentioned in the above example have been found to be suitable to the particular treatment set forth, but it is to be understood that these proportions may be varied.

What I claim as my invention and desire to secure by Letters Patent is:—

1. The herein described method of producing an infusible resilient composition for printers' rollers which consists in treating a gelatinous water-containing mass with compounds produced by the condensation of an aldehyde with an amino compound.

2. The herein described method of producing an infusible resilient composition for printers' rollers which consists in treating a mixture of glue soaked in water and glycerin with compounds produced by the condensation of an aldehyde with an amino compound.

3. The herein described method of producing an infusible resilient composition for printers' rollers which consists in treating a gelatinous water-containing mass with the product produced by condensing together formaldehyde and amin.

4. The herein described method of producing an infusible resilient composition for printers' rollers which consists in treating a gelatinous water-containing mass with the product produced by condensing together formaldehyde and anilin.

5. The herein described method of producing an infusible resilient composition for printers' rollers which consists in treating a mixture of glue soaked in water and glycerin with the product produced by condensing together formaldehyde and an amin.

6. The herein described method of producing an infusible resilient composition for printers' rollers which consists in treating a gelatinous water-containing mass with a cream formed by mixing with glycerin the condensation product produced by re-acting formaldehyde with anilin.

7. The herein described method of producing an infusible resilient composition for printers' rollers which consists in treating a gelatinous water-containing mass with a cream formed by mixing with glycerin and water the condensation product produced by re-acting formaldehyde with anilin.

8. The herein described method of producing an infusible resilient composition for printers' rollers which consists in treating a gelatinous water-containing mass with a cream formed by mixing insoluble condensation products of an aldehyde and an amino compound with water and glycerin.

9. The herein described process of producing an infusible resilient composition suitable for printers' rollers which consists in mixing and melting up together glue soaked in water and glycerin, introducing into the melted mixture the compounds produced by the condensation of an aldehyde with an amino compound and running the mixture into molds.

In testimony whereof I have signed my name to this specification in the presence of two subscribing witnesses.

CHARLES EMILE SOANE.

Witnesses:
HARRY B. BLIDGE,
GEORGE E. WESTON.